March 29, 1960  B. WALTERSCHEID-MÜLLER ET AL  2,930,212
OVERLOAD CLUTCH WITH BRAKING MECHANISM
Filed April 1, 1957

INVENTORS
BERNHARD WALTERSCHEID-MÜLLER
KURT SCHRÖTER

By *Toulmin & Toulmin*

Attorneys

United States Patent Office 2,930,212
Patented Mar. 29, 1960

2,930,212

OVERLOAD CLUTCH WITH BRAKING MECHANISM

Bernhard Walterscheid-Müller, Lohmar, Siegkreis, and Kurt Schröter, Herkenrath, near Bergisch Gladbach, Germany, assignors to Jean Walterscheid, Maschinenfabrik und Hammerwerk, Siegburg, Germany Application April 1, 1957, Serial No. 649,741

Claims priority, application Germany January 5, 1957

9 Claims. (Cl. 64—29)

The present invention relates to an overload clutch of the type which has resiliently biased driving dogs to provide a driving connection between the driving and driven members of the clutch, more particularly, to a braking arrangement which operates to brake the relative movement between the driving and driven members when these members are disengaged upon exceeding a predetermined torque.

It is the principal object of this invention to provide an improved overload clutch.

It is another object of this invention to eliminate the torsional vibrations between the driving and driven members of an overload clutch when said members are disengaged upon exceeding a predetermined torque.

It is a further object of this invention to rapidly decrease the relative motion between the driving and driven members of an overload clutch occurring when these members are disengaged upon exceeding a predetermined torque.

It is an additional object of this invention to provide an overload clutch wherein the major portion of a predetermined torque is transmitted through resiliently biased driving dogs and only a small portion of the predetermined torque is transmitted through frictional braking between the driving and driven members of the clutch.

It is still another object of this invention to provide a longer lasting and quieter operating overload clutch.

It is still a further object of this invention to provide an overload clutch which provides braking between the driven and driving members when these members are disengaged from each other but will transmit with great accuracy a predetermined torque over a considerable period of time.

It is still an additional object of this invention to provide an overload clutch having braking between the driving and driven members when these members are disengaged but with the braking force between these members being variable and never constant so that the generation of heat from braking is greatly reduced.

Figure 1:
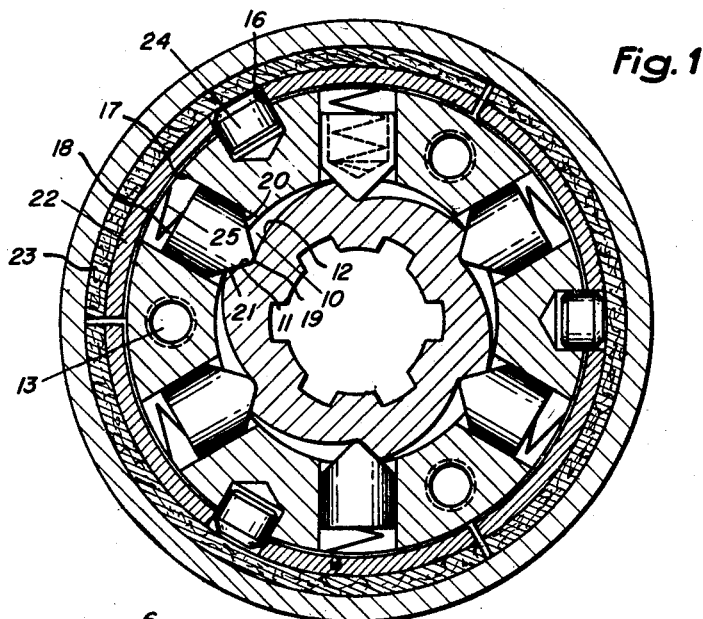
Figure 2:
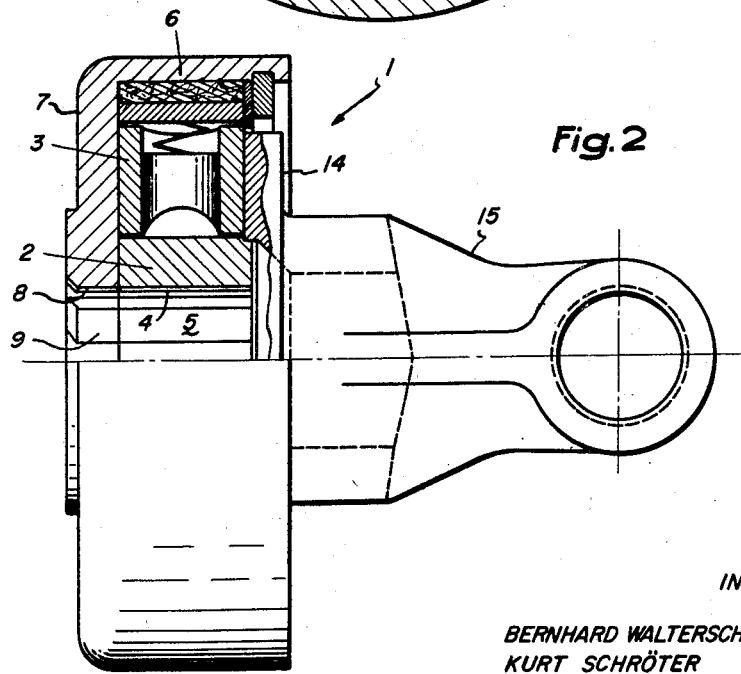

Other objects in the value of this invention will become apparent upon reference to the accompanying description when taken in conjunction with the following drawings wherein;

Figure 1 is a transverse sectional view taken along the lines 1—1 of Figure 2 and showing the construction of the overload clutch of this invention; and Figure 2 is a side elevational view of the overload clutch of this invention with a portion thereof removed to illustrate the relationship between the various components thereof.

Returning now to the drawings, more particularly to Figure 1, wherein like reference symbols indicate the same parts throughout the various views, the overload clutch of this invention is indicated at 1 and essentially comprises a driving member 2 and a driven member 3. The driving member 2 has an axial bore 4 with a plurality of splines 5 along the surface thereof. The splines are for the purpose of connecting the driving member of the clutch to a shaft which extends either from a prime mover or from a transmission.

There is annular brake drum 6, which is radially spaced from the outer surface of the driving member 2. The brake drum 6 is connected by a disc 7 which has a central bore 8 therein with a plurality of splines 9 on the surface of the bore. The splines 9 correspond with the driving member splines 5 so that the brake drum and the driving member rotate as a single unit.

As an alternative construction the brake drum disc and driving member may be made as a single integral unit.

There is a plurality of circumferentially spaced axially extending depressions 10 on the outer surface of the driving member 2. Each of the depressions comprises intersecting walls 11 and 12 which form axial grooves on the outer surface of the driving member. As may be seen in Figure 1, the walls 11 and 12 have different slopes with the wall 11 having a larger inclination than the wall 12. The reason for this will become apparent as the operation of the clutch is described.

The driven member 3 is essentially in the form of an annular ring and is located between the brake drum 6 and the driving member 2. The driven member 3 is secured by a plurality of bolts 13 to a disc 14 which has a pair of axially extending arms 15 which are connected to the wheel or other component which is to be powered through this clutch.

The driven member 3 has a plurality of radially extending recesses 16 which are circumferentially spaced upon the outer surface thereof. Located between recesses 16 are a plurality of radially extending passages 17 which pass completely through the driven member 3. A driving dog 18 is slidably mounted in each of the passages 17. The inner end of each dog 18, as indicated at 19, has a bevelled face to form inclined surfaces 20 and 21. The surfaces 20 and 21 are at the same angle of inclination which is equal to the angle of inclination of a steep wall 11 of the depressions on the driving member. Thus when the driving dogs are in a position as indicated in Figure 1, a torque will be transmitted by the driving member through the driving dogs to the driven member of the clutch.

Mounted about the periphery of the driven member 3 is a plurality of brake shoes 22 each of which has a brake lining 23. Each brake shoe 22 is secured to a stud 24 which is slidably received in one of the radial recesses 16 in the driven member. Springs 25 connect each pair of the driving dogs 18 with the inner surface of a brake shoe 22. The two driving dogs which are on either side of the brake shoe stud 24 are connected to that brake shoe.

The function of the spring 25 is to urge the dogs 18 into driving engagement with the driving member depressions 10. In addition, the springs continually urge the brake shoes against the brake drum to cause a braking action between the driven member and the driving members of the clutch. This braking action is more pronounced when the driving and driven members are disengaged as will be subsequently explained.

The springs 25 are chosen to exert a specific force against the driving dogs to enable the clutch to transmit a predetermined torque. The major portion of this torque is transmitted through the driving dogs with only about 10 to 25% of the predetermined torque transmitted by the braking action between the drum and the brake shoes.

When the predetermined torque is exceeded the dogs 18 will ride up over the inclined depression walls 11 with the result that the dogs will be disengaged from the driving member 2. This outward radial movement of the driving dogs 18 will compress the springs 25 which in turn will cause the brake shoes to exert a greater force against the brake drum. Accordingly, the driven member 3 will be braked against the driving member 2. This braking action greatly reduces the torsional vibrations existing between the driving and the driven members while they are disengaged. In addition, the relative movement between these two members while they are disengaged is also decreased. The decrease in relative movement also shortens the period during which these members are disengaged from each other. As a result the driving dogs are more quickly brought into driving position with the depressions of the driving member.

The entire torque transmitted by this overload clutch is substantially dependent upon the driving dogs and the dog springs since the torque which is transmitted by the braking surfaces is a relatively small fraction of the predetermined torque. Hence, the overload torque of the clutch can be accurately set. Furthermore, the clutch will continue to become disengaged at this particular overload torque for a long period of time. Thus, it will only be necessary to change the overload torque when the clutch is to be operated under different conditions. Constant adjustment of the overload torque under the same conditions is unnecessary.

There are several advantages to be gained from the overload clutch of this invention. There is a considerable reduction in the wear of the dogs and the walls of the depressions of the driving member because of the reduced relative movement between the driving and driven members. Hence the period of time during which the dogs ride over the recesses is decreased. This also reduces the heat generated by the dogs riding over the outer surface of the driving member. The friction generated between the braking surfaces during the disengagement of the driving and driven members is also greatly reduced because the braking action between these members is not constant but varies as the springs are compressed and stretched by the irregular movements of the dogs over the recesses.

Thus it can be seen that this invention provides a simplified overload clutch which automatically brakes the driving and driven members upon disengagement of these members. The resulting braking does not decrease the life of the clutch but on the contrary the life of the clutch is considerably lengthened and maintenance problems are minimized.

It will be understood that this invention is susceptible to modification in order to adapt it to different usages and conditions, and, accordingly, it is desired to comprehend such modifications within this invention as may fall within the scope of the appended claims.

It is claimed:

1. In an overload clutch, a driving member having a plurality of depressions therein, a driven member having a plurality of driving dogs, resilient means for biasing said dogs into engagement with said depressions whereby a predetermined torque is transmitted between said driving and driven members, and braking means on said driven member actuated by said resilient means to brake said driven member against said driving member when said dogs are disengaged from said depressions upon exceeding a predetermined torque to brake the relative movement between said driving and driven members.

2. In an overload clutch, a driving member, a driven member, means for engaging said driving and driven members to transmit a predetermined torque, braking means on one of said driving and driven members for braking the relative movement between said driving and driven members when said members are disengaged upon exceeding said predetermined torque.

3. In an overload clutch, a driving member having a plurality of depressions thereon, a driven member having a plurality of driving dogs for drivingly engaging said depressions to transmit a predetermined torque therebetween, and braking means on one of said driven and driving members actuated by said driving dogs to brake said driven member against said driving member when said predetermined torque is exceeded and said dogs disengage said driven member from said driving member.

4. In an overload clutch, a driving member, a driven member, a means for drivingly engaging said driving and driven members to transmit a predetermined torque therebetween, and means on said driven member for braking said driven member against said driving member when disengaged therefrom to brake the relative movement between said driving and driven members.

5. In an overload clutch, a cylindrical driving member, an annular portion spaced outwardly from said cylindrical driving member to form a brake drum and rotatable with said driving member, there being a plurality of depressions on the outer surface of said driving member, a cylindrical driven member positioned between said driving member and said annular portion, there being a plurality of radial passages in said driven member, a driving dog in each of said passages and engageable with any of said depressions, a plurality of brake shoes on the outer face of said driven member, and spring means in said passages between said driving dogs and said brake shoes to urge said dogs into engagement with said depressions to transmit a predetermined torque between said driving and driven members and to urge said brake shoes against said brake drum when compressed by the disengagement of said driving dogs from said depressions.

6. In an overload clutch, a driving member, an annular portion spaced outwardly from said driving member to form a brake drum and rotatable with said driving member, there being a plurality of depressions on the outer surface of said driving member, a cylindrical driven member positioned between said driving member and said annular portion, there being a plurality of radial passages in said driven member, driving dogs in said passages and engageable with said depressions, a plurality of brake shoes on the outer face of said driven member, and spring means in said passages between said driving dogs and brake shoes to urge said dogs into engagement with said depressions to transmit a predetermined torque and to urge said brake shoes against said brake drum when compressed by the disengagement of said dogs from said depressions, said springs being so selected that the torque transmitted by said braking surfaces during the engagement of said driving and driven members is 10 to 25% of the predetermined torque transmitted by said clutch.

7. In an overload clutch, a driving member having a plurality of depressions on the outer surface thereof, a brake drum rotatable with said driving member, a driven member, a plurality of driving dogs in said driven member and engageable with said depressions, a brake shoe mounted on said driven member for radial movement with respect thereto, and spring means between said brake shoe and driving dogs for urging said dogs into driving connection with said depressions whereby said dogs will transmit a predetermined torque and said brake shoes will be urged against said brake drum by said spring when said predetermined torque is exceeded and said dogs override said depressions.

8. In an overload clutch, a driving member, an annular portion spaced outwardly from said driving member to form a brake drum and rotatable with said driving member, there being a plurality of depressions on the outer surface of said driving member, each of said depressions have inclined walls with one of said walls being considerably more inclined than the other, a driven member positioned between said driving member and said annular portion, there being a plurality of radial passages in said driven member, a driving dog in each of said passages and engageable with said depressions, the inner ends of each of said dogs having intersecting surfaces inclined at an angle substantially equal to the steeper angle walls of said depressions, a plurality of brake shoes on the outer face of said driven member, and spring means in said passages between said driving dogs and brake shoes to urge said dogs into engagement with said depressions to transmit a predetermined torque and urge said brake shoes against said brake drum when compressed by the disengagement of said dogs from said depression.

9. In an overload clutch as claimed in claim 5, with there being a pair of said driving dogs acting upon each brake shoe.

References Cited in the file of this patent

UNITED STATES PATENTS

| | | |
|---|---|---|
| 95,837 | Reaney | Oct. 12, 1869 |
| 680,170 | Oldfield et al. | Aug. 6, 1901 |
| 1,119,938 | Dustin et al. | Dec. 8, 1914 |
| 1,587,724 | Harley | June 8, 1926 |
| 1,730,890 | Kaisser | Oct. 8, 1929 |
| 2,515,295 | Davis | July 18, 1950 |